April 24, 1956 — L. SILVERMAN — 2,742,897
SPIROMETER
Filed Sept. 15, 1954 — 2 Sheets-Sheet 1
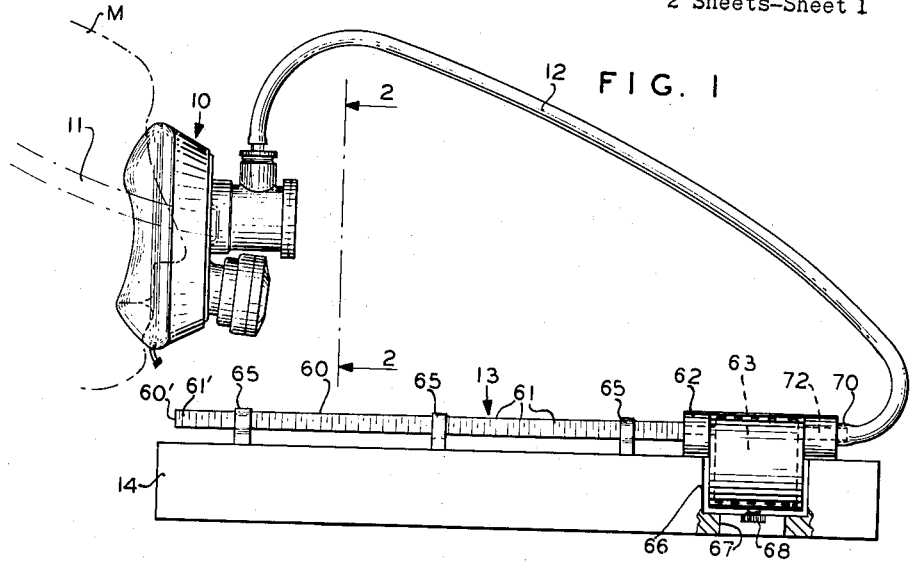
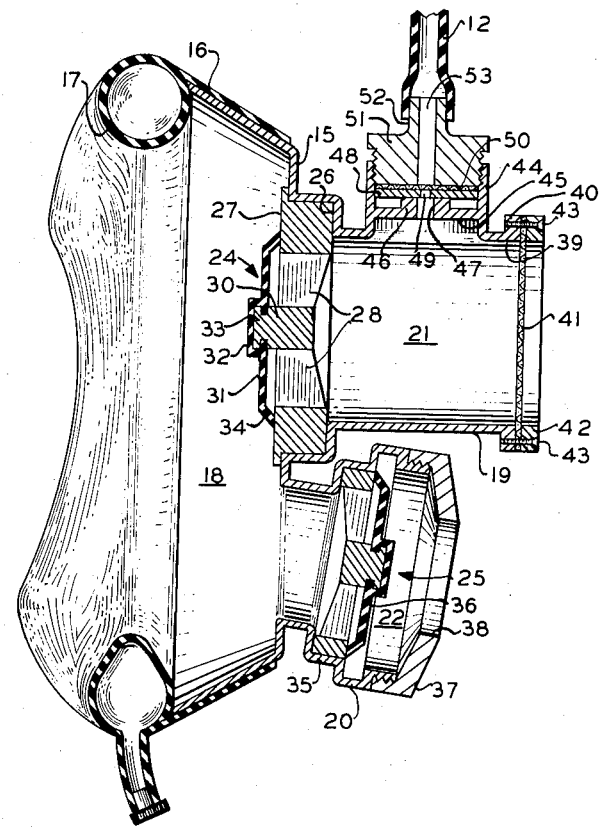
FIG. 3
INVENTOR
LESLIE SILVERMAN
BY
ATTORNEY

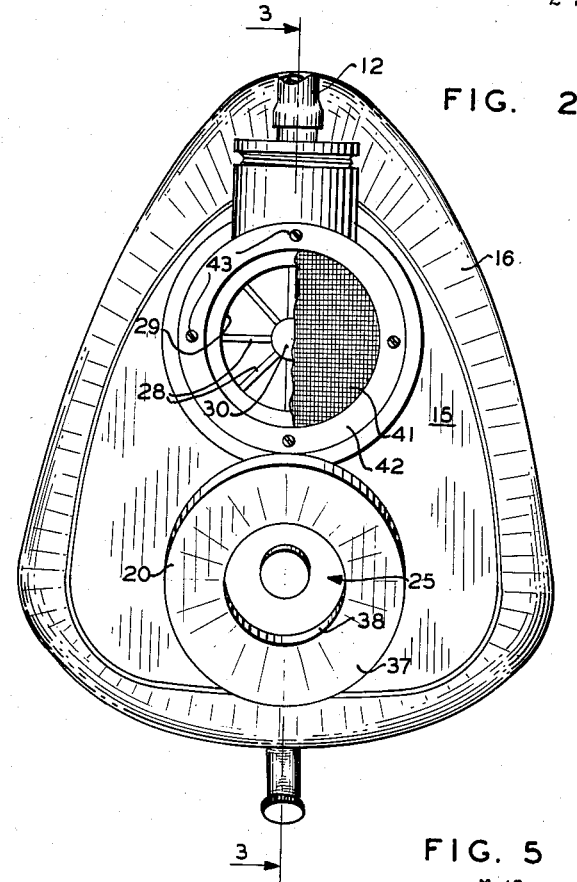
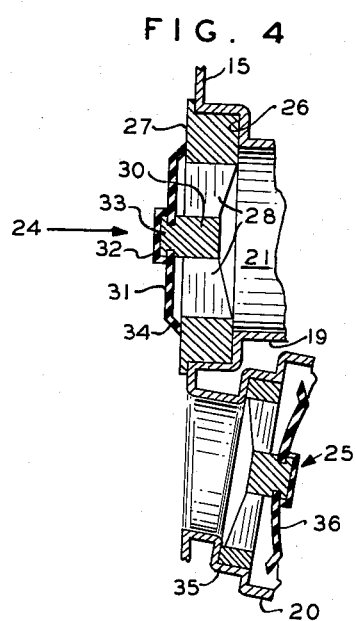
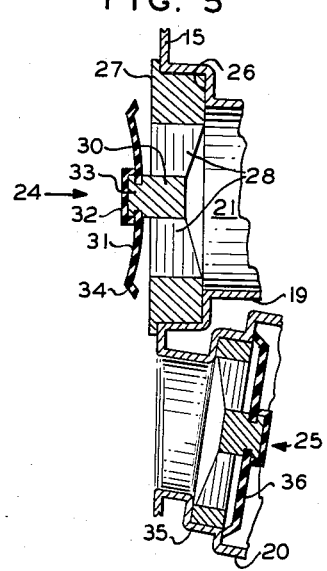

United States Patent Office 2,742,897
Patented Apr. 24, 1956

2,742,897

SPIROMETER

Leslie Silverman, Dover, Mass.

Application September 15, 1954, Serial No. 456,168

10 Claims. (Cl. 128—2.08)

This invention relates to flow-measuring devices and particularly to measuring instruments, such as spirometers, utilized to determin the volumes of gases delivered to the lungs of a patient during respiration.

The measurement of respiration gas volumes is of importance for various purposes; for example, in the determination of certain physiological data, such as lung capacity, or in the observation of a patient's respiration while under anesthesia. It is a basic requirement that the instrument used for these volume measurements be precise and capable of a high degree of accuracy.

Several different types of instruments have been in use heretofore which have been adapted to measure the volumes of gases exchanged between the lungs of a patient and a source of breathing gas during respiration. However, these instruments have been inherently deficient for the most part, either as a result of their cumbersome and unwieldy construction or as a result of their inability to afford sufficiently precise or accurate measurements. One type of instrument, for example, is characterized by the utilization of an expansible fluid-sealed chamber to which the gases exhaled during each respiration cycle are conducted. The volume of expired gas is measured by determining the increase in volume of the container. Ordinarily, this procedure is carried out for a period covering several successive respiration cycles. Therefore, the expansible chamber must be relatively large in size, in order to accommodate the aggregate volume of the expired gases. It has not been possible previously to avoid using such unduly large containers or vessels without either incurring objectional error, or necessitating the use of non-linear scales and subsequent computations in order to obtain a correct measurement.

It is an object of the present invention to provide an improved means for measuring gas flow which is particularly adapted for containment in a compact and readily usable structure, and in which a divided portion of the total gas flow is utilized to accurately measure and directly indicate the total gas flow.

It is a further object of the invention to provide an improved spirometer device, embodying such means for measuring gas flow wherein a divided, sample portion of the respiration gases is utilized for measurement of the total flow, which is contained in a substantially portable apparatus of simple and compact structure.

It is a further object of the invention to provide such an improved spirometer device, in which the sample portion of the respiration gases are delivered to means for indicating the total flow, during either the inhalation or exhalation phase of each respiration cycle, and said flow-indicating means is effective to integrate the measured gas flow for a period covering two or more successive breathing cycles.

It is a still further object of the invention to provide an improved spirometer of the type described, wherein the dead space in the breathing circuit, external to a patient's respiratory tract, is minimized and the volume of rebreathed gases is thereby reduced to a substantially negligible amount.

In a spirometer device according to the present invention, improved flow-measuring means are provided in which the total gas flow to be measured is conducted through a main flow conduit having at least two branch passages connected in series therewith, each of which carries a divided part of the total flow. Each of the branch passages is provided with laminar-flow restricting means disposed therein which is effective to maintain the divided part of the total flow therein in a fixed ratio to the flow in each of the other branch passages and to the total flow in said main conduit. A flow-indicator device is associated with one of said branch passages, which is responsive to the divided part of the total flow through said associated branch passage, to directly indicate the total gas flow in said main conduit. A spirometer constructed according to a preferred embodiment of the invention comprises a face-contacting member forming a breathing chamber having separate inhalation and exhalation ports through which respiration gases are alternately delivered to and discharged from the chamber during each breathing cycle, and means connecting with one of said breathing chamber ports for conducting all of the gas delivered therethrough, including a main conduit and a plurality of parallel-flow, branch passages connected in series therewith, each of which carries a divided part of the total flow. Each of the branch passages is provided with laminar-flow restricting means disposed therein which is effective to maintain the divided part of the total flow therein in fixed ratio to the flow in each of the other branch passages and to the total flow of respiration gas in said main conduit. A flow-integrating device is connected to one of said branch passages which is responsive to the divided part of the total flow therethrough to indicate the total respiration gas volume during any interval.

The invention, as it is embodied in a preferred form shown and described herein, comprises a face mask having a breathing chamber and valve-controlled inlet and outlet ports in communication therewith. A portion of the face mask forms a main flow conduit communicating with one of said breathing chamber ports which connects at its opposite end with at least two parallel-flow, branched passage means, each of which carries a divided portion of the total gas flow conducted in said main flow conduit, to or from said corresponding breathing chamber port. One of the branch passages, formed by a terminal opening of said main conduit, is of relatively large, effective flow area and a second passage, arranged to intersect said main conduit, has a relatively small, effective flow area. The smaller, or second, branch passage thus constitutes a parallel flow passage with respect to said terminal opening, through which a small gas flow, in proportion to the flow through said terminal opening, is conducted. The laminar-flow restricting means for the respective parallel branch passages are disposed, respectively, across said terminal opening and in said secondary passage substantially in the vicinity of the point of entrance thereof into said main conduit. A flow-indicating device is connected to the secondary passage, which is of the so-called "bubble displacement" type, wherein a film, such as a soap bubble, is positioned in the bore of an elongated, calibrated glass tube and displaced lengthwise therein in accordance with the change in the volume of gas contained therein.

The "laminar-flow restricting means" utilized in the present invention constitute flow-restricting means effective to produce laminar, viscous gas flow in each of the respective branch passages, such that the pressure drop across each corresponding flow restriction will be directly proportional to the gas velocity therethrough (i. e., a linear function). In the spirometer device constructed in accordance with the preferred form of the present invention, the differential flow pressure corresponding to each of the branch passages are substantially equal to each other during the operation of the device. Consequently, according to the laws of fluid flow, it will be seen that the ratios of the gas flows in the respective branch passages will be substantially equal to the ratios of the effective flow areas of the corresponding branch passages. Thus, the provision of laminar-flow restricting means as prescribed herein provides divided parts of the total gas flow which are directly proportional to each other and to the total gas flow, independently of gas velocity, in the ratio of the respective, effective flow areas, whereby the total flow may be accurately derived from one of said divided sample portions without error due to non-linearity, over a range of varying gas velocities. Preferably, the flow-restricting means comprise fine mesh, wire screens in which the gas stream is broken up into several minute, laminar-flow channels creating, in effect, an overall laminar flow through the screen. However, other types of flow elements capable of producing laminar flow may be used, such, for example, as a bundle of elongated capillary tubes wherein the gas stream is similarly broken up into a number of subdivided laminar-flow channels. Laminar flow through such restriction means occurs when the Reynolds Number for the gas stream in each of the minute flow-channels is less than the critical value of 2,000. Preferably, in order to obtain a high degree of linearity and thereby achieve greater accuracy in the readings, the flow-restricting elements are designed and constructed such that the Reynolds Number for the gas streams in the subdivided flow channels is in the order of 400 to 600, which is considerably below the critical value. One of the significant requirements that must be considered, in the provision of the flow-restricting elements, is that the restrictions should produce a minimum obstruction to normal respiration. For example, the total effective resistance to respiration should preferably not exceed approximately 6 mm. of water for a flow of about 100 liters per minute. Thus, the overall dimensions and fineness of the screen mesh, or the sizes and number of capillary tubes, which are used to provide the desired laminar-flow restricting elements are selected such that the overall flow requirements are met while at the same time laminar flow conditions are maintained. To illustrate, a spirometer constructed in accordance with the preferred form of the present invention is provided with a main conduit, connecting with the inhalation breathing chamber port of a face mask, having an outer terminal opening of two inches (2.0") diameter. A secondary branch passage intersecting said main conduit is provided with an orifice plate limiting the flow diameter of the flow-restricting element therein to two one-hundredths of an inch (0.02"). The terminal opening of the main conduit is covered with a 4-hundred mesh, Monel wire screen (code PAB, twilled weave) and a screen of identical designation is disposed in confronting relationship to the flow orifice in the secondary branch passage. The fine screens thus disposed provide the desired laminar-flow restrictions. These dimensions for the main conduit and the secondary branch passage and for the respective flow restricting elements were found to be suitable and did not produce any objectionable resistance to normal respiration. It will be apparent, that the ratio of the gas flows through said terminal opening and through said secondary passage, is equal to the ratio of the respective flow areas thereof, and that in the present illustration the flow through said secondary branch passage is 1/1000 that of the flow delivered through said terminal opening. Suitably calibrated, flow-indicating means connecting with said secondary branch passage enable the total gas flow to be read directly, based upon the small, divided portion thereof supplied through said secondary branch passage.

In the absence of laminar-flow restricting means as described herein, it would not be possible to obtain an accurate determination of the total gas flow from a sample portion thereof, since the differential flow pressures in such event would not have a linear relationship to the respective flow velocities and the ratio of the sampled gas flow to the total flow would vary at different flow velocities. This factor is aggravated in breathing devices, such as spirometers, wherein the gas velocity varies over the period of flow measurement during inhalation and exhalation.

A more complete understanding of the invention, and other of its advantages, may be had by reference to the following description of a preferred embodiment of the invention and the accompanying drawings in which;

Figure 1 shows a spirometer device constructed in accordance with the invention, including a face mask completely enclosing the mouth and nose of the wearer and a flow-indicating device connected therewith;

Figure 2 is a frontal view of the face mask, partially sectioned, taken substantially along the line 2—2 in Figure 1, looking in the direction of the arrows;

Figure 3 is a sectional view of the face mask taken substantially along the line 3—3 in Figure 2, looking in the direction of the arrows;

Figure 4 is a partial, sectional view showing a segment of the face mask seen in Figure 3, illustrating the positions of the inhalation and exhalation check valves contained therein, during the exhalation phase of a respiratory cycle; and, Figure 5 is substantially identical to Figure 4, but showing the positions of the inhalation and exhalation check valves during the inhalation phase of a respiratory cycle.

Referring now to the drawings, a face mask designated generally at 10 is shown as it would be worn by a patient whose face is indicated by the outline M. A conventional headstrap arrangement such as the harness 11 keeps the face mask in position during use. The mask is connected by means of a flexible tubing 12 to a flow indicating device 13 which is provided with a supporting base 14.

The construction of the face mask is shown in greater detail in Figures 2 and 3. As seen, particularly with reference to Figure 3, the face mask includes a substantially rigid body 15 which may be made, for example, out of a light, thin metal, or out of a suitable molded plastic, and a rim 16, of soft rubber or other relatively flexible material, forming a resilient face-contacting edge for the mask body. Preferably, the rim 16 has an inflatable, annular, hollow section 17 and is anatomically shaped to correspond approximately with the facial contours of the patient. When the mask is worn, as it is shown in Figure 1, a breathing chamber 18 is formed within the face mask which is sealed from the surrounding atmosphere by the face-contacting rim 16. The outer side of the rigid face mask body carries cylindrical housing members 19 and 20, forming conduits 21 and 22, respectively, which communicate with the breathing chamber 18. The passage of gas through the conduits, to or from the breathing chamber, is governed by check valves 24 and 25. The inhalation check valve 24 is disposed in the inner end of the conduit 21 in an enlarged recess 26 provided for this purpose. This valve consists essentially of an annular rim 27 having a plurality of vanes 28 extending radially inwardly, and supporting substantially at the axial center of the valve opening 29 a central hub 30 on which a rubber, disc-shaped, flap-valve element 31 is retained. The flap-valve element is of a well-known type in which the central portion is cupped as shown at 32 so that the opening therein may be stretched over and seated on a button 33 formed on the projecting end of the central hub member 30. It will be seen that the center of the flap-valve element is thereby anchored, leaving the outer peripheral edge thereof free to move in or out with respect to the annular rim 27. The flap-valve element is turned in slightly at its outer periphery as shown at 34 and creates a slight, initial seating stress against the rim. Thus, during inhalation the flap-valve element is moved away from the annular seating rim permitting gas to pass through the central opening 29 of the valve to the breathing chamber 18, while on exhalation it is forced against the annular rim portion thus closing the valve opening. This type of check valve is particularly suitable for devices used in conjunction with respiration inasmuch as it is adapted to be operated by very slight pressure differentials, not normally discernible by the patient. The exhalation check valve 25, disposed in the outwardly projecting housing 20, is received in a suitable shoulder recess 35. This valve is substantially identical in construction to that of the check valve 24, but is reversed with respect thereto. Consequently, the flap-valve element 36 of the exhalation valve is closed during inhalation and is opened during exhalation such that gases are permitted to pass therethrough only for discharge from the breathing chamber. The positions of the check valves 24 and 25 during the exhalation phase of a respiration cycle are shown in Figure 4 and the positions of these respective valves during inhalation are shown in Figure 5. It will be seen as a result of the construction of the face mask above described and the check valve means provided therein, that gases, isolated from the surrounding atmosphere, are delivered to the breathing chamber 18 during the inhalation phase of each cycle through the conduit 21 of the housing 19 and the opening 29 of inhalation check valve 24; and that the exhalation gases are discharged from the breathing chamber during each exhalation phase through the opening of the exhalation check valve 25 and the conduit 22 of the housing 20. The outer end of the cylindrical housing 20 is provided with a protective cap 37 threaded thereon, which has a central opening 38 to the atmosphere.

The housing 19 is provided with means forming first and second parallel-flow passages which deliver independent, separate gas flows to the conduit 21 and thence to the breathing chamber 18 through the inhalation check valve 24. As shown in Figure 3, the main conduit 21 of the housing 19 terminates in an end opening 39 which is provided with a surrounding end flange 40. A fine mesh screen 41, constituting the laminar-flow restricting element for the opening 39, is placed across the end opening and is held in position by means of a ring 42 which is tightened by screws 43 against the end flange 40 to compress the peripheral edges of the screen therebetween. A secondary passage in substantially parallel flow relationship with respect to the terminal opening 39 is formed in a cylindrical boss 44 which is formed in a side wall of the housing 19 and extends radially outwardly therefrom. The boss 44 includes a web, or partition 45, adjacent its inner end, the central portion 46 of which is substantially thicker in cross-section and in which is formed an opening 47. An orifice plate 48, having a calibrated orifice opening 49, is received in the cylindrical boss 44 and is positioned against the inner partition 45 so that the orifice opening registers with the opening 47. A fine mesh screen 50, constituting the laminar-flow restricting element for the said secondary passage, is firmly pressed against the orifice plate 48 by means of an outer plug 51 which is threadedly received in the boss 44. The plug is provided with an outer reduced neck 52 on which the hose 12, connecting with the flow-indicating device 13, is received. A longitudinally extending passage 53 in the plug forms a communication between the hose 12 and the passage provided by the orifice opening 49 and the opening 47. Thus, the hose 12, passage 53, screen 50, orifice opening 49 and passage 47 form a continuous secondary passage which intersects the main flow conduit 21 of the housing 19 and bears a parallel flow relationship with respect to the passage formed by the terminal opening 39.

The flow-indicating device 13, seen in Figure 1, is of the so-called "bubble-displacement" type. It will be understood that the primary function of the flow-indicating device is to respond to the small part of the total gas volume delivered through the secondary flow passage, governed by the opening 49 of the orifice plate 48, to accurately indicate the total gas flow for any given time interval. The indicator comprises an elongated tube 60, having a series of longitudinally spaced calibrations 61, which is seated in a receiver block 62 having an inner chamber 63. The integrally assembled tube and block are mounted on the supporting base 14 by any suitable means such as a series of pairs of spring clips 65 which press inwardly at longitudinally spaced points against opposite sides of the elongated tube 60. The base support 14 is provided with an enlarged recess 66 in which the block 62 is accommodated. An opening 67, through the bottom of the recess 66, affords access to a removable plug 68, which, it will be seen hereinafter, is provided to permit the drainage of excess fluid accumulated in the chamber 63 of the receiver block. The bore of the calibrated tube 60 opens at the outer end 60' thereof to the atmosphere and communicates at its inner end with the chamber 63. A nipple 70, formed on the block 62, has a passage 72 therein which opens into chamber 63 and receives the end of connecting hose 12 thereon. Thus, it will be apparent that the bore of the elongated, calibrated tube 60, chamber 63, and passage 72 form an extension of the passage formed by the hose 12, passage 53, orifice opening 49 and opening 47 which communicates with the breathing chamber of the face mask through the main conduit 21 and inhalation check valve 24.

It will be apparent that in the present apparatus the laminar-flow restricting element 41 in the terminal opening 39 is exposed at its outer side to atmospheric pressure and that the corresponding outer side of the flow-restricting element 50 is also exposed, effectively, to atmospheric pressure; the latter communicating with the connecting tube 12 and the open-ended, calibrated tube 60 wherein the pressure drop due to the flow of gas therethrough is substantially negligible. Inasmuch as the flow-restricting elements are exposed also on their inner sides to substantially equal pressure zones, the pressure differential across each of them is substantially identical. Thus, due to the linear relation of the flow velocity to the pressure differential, as hereinbefore described, the volume gas flows through the restricting element 41 and element 50 are directly proportional to each other in the ratio of the respective, effective flow areas thereof. Consequently, the flow indicating device 13, suitably calibrated, will respond to the flow through the secondary passage, containing the laminar-flow restricting element 50, the effective area of which is defined by the orifice opening 49, to directly indicate the total flow.

In order to use the apparatus now described, a suitable film, such as a soap film, is first placed across the terminal opening 60' of the elongated, calibrated tube 60 forming a "seal" at the outer end of the tube bore. The film readily moves within the tube bore in response to changes in the volume of gas contained therein. Substantially no pressure drop occurs and the pressure within the tube bore is essentially atmospheric. The soap film may be obtained from a water solution of soap, or any suitable wetting agent such as Aerosol, or any satisfactory detergent or castile soap. By first agitating the water solution thereof, bubbles are generated, which may then be transferred to the end of the calibrated tube 60. It is usually desirable to first wet the inside of the tube so that the movement of the film along the bore thereof will be uniform. The face mask is placed in position as shown in Figure 1, such that all of the patient's breathing is confined to the breathing chamber within the face mask and all of the inhalation and exhalation gases caused to be conducted, respectively, through the inhalation conduit 21 and the exhalation conduit 22. The soap film is adjusted so that it will be positioned, at the outset of the flow-measuring period, at the point corresponding to the zero position indicated at 61' of the calibrated scale 61. This may be done conveniently, for example, by a series of short inhalations at the face mask which will cause the soap film to be drawn inwardly until it is at the desired position. Thereafter, normal breathing is resumed. It will be seen that during each inhalation, gas will be received into the conduit 21 and then through the inhalation check valve 24 into breathing chamber 18. The total volume inhaled will comprise the gas delivered through the flow-restricting member 41 in the outer end of cylindrical conduit member 19, plus the volume delivered through the flow-restricting member 50 in the cylindrical boss 44. The gas conducted through the latter flow-restricting member is received from the bore of the tube 60 as a result of a slight drop in pressure during inhalation which causes gas to be withdrawn from the bore of the elongated, calibrated tube 60 through the chamber 63, and the connecting hose 12. In response to the withdrawal of gas therefrom, the soap film is caused to move inwardly in the bore of the elongated tube 60, an amount corresponding to the volume of gas delivered through the flow restriction 50 during each inhalation. Upon each successive inhalation, the soap film will be displaced an additional increment so that over a period of several breathing cycles, the total displacement of the bubble will correspond to the total volume of gas withdrawn from the tube 60. It will be apparent, in accordance with the description of the apparatus given hereinbefore, that the volume of gas passed through the flow-restricting member 50 is directly proportional to the gas flow through the flow-restricting member 41 and, hence, also directly proportional to the total gas volume inhaled. Therefore, by proper calibration of the scale 61 the position of the soap film within the elongated bore indicates directly the total volume of gas inhaled.

For example, in a device having the effective flow areas of the restricting elements 50 and 41, as given hereinbefore, wherein the effective flow diameter of the element 41 is 2 inches and the effective flow diameter of the element 50 is 0.02 inch, such that the ratio of the effective flow area of the restricting element 50 to that of the restricting element 41 is 1:1000, the total inhalation volume may be read as follows, when the calibrated tube 60 is provided with calibrations in increments of milliliters: With the indicating bubble displaced from zero (0) to a point opposite the 3 milliliters marking, it will be seen that 3 milliliters of the gas volume in the tube has been delivered through the restricting element 50 and that 3 liters (one thousand×3 milliliters) has been delivered through the restricting element 41, giving a total inhalation volume of 3.003 liters. For most purposes, especially where the ratio of the effective flow areas of the respective restricting elements is substantially 1:1000 or less, the small volume of gas delivered through the secondary passage may be neglected and, in the example above, the total flow may, therefore, be considered as 3 liters. On the other hand, where it is essential for certain purposes to obtain the exact total volume, the scale can be suitably calibrated to account for the smaller fraction delivered from the calibrated tube, without error, since the displacement of the indicating bubble therein is a linear function of the total volume. In determining lung capacity, the total volume thus obtained, divided by the number of inhalations or exhalations will give the volume of gas which the patient's lungs are capable of respiring. It will be apparent that the measurement may be obtained for a period covering a single respiration cycle or may be continued over a period covering a number of cycles.

The degree of precision of the readings may be varied by selecting calibrated tubes of different bore diameter which will result in a greater or smaller longitudinal displacement, as desired, of the soap film for an equivalent gas volume. Varying sizes of orifice openings may also be used to vary the proportion of the gas volumes delivered through the respective branch passages. When a test has been completed, the soap film remaining in the bore of the tube may be eliminated by blowing into the outer end of the tube and causing the film to be ejected into the chamber 54. Following a large number of such tests, after which a considerable amount of liquid has accumulated in the chamber 63, such liquid may be eliminated by removing the drainage plug 68.

While the apparatus herein described is arranged to sample the gas flow during the inhalation phase of each breathing cycle, it will be readily understood that the apparatus could be used equally as well for measuring the gases during exhalation. This may be readily accomplished by reversing the check-valves 24 and 25 such that the inhalation gases would be drawn into the breathing chamber 18 through the cylindrical conduit 22 and exhalation gases discharged through the conduit 21. In such case, the sampled portion of the total flow measured in the recording device 13 would increase the volume of gas contained in the calibrated tube 60 instead of withdrawing gas therefrom, as above. Accordingly, the soap bubble would first be placed at a starting point toward the inner end of the tube and would be caused to move in increments in the opposite direction through the tube upon each exhalation.

The bubble displacement type of flow indicating instrument herein described is believed to be advantageous for the purpose of the present invention. One of its advantages is that displacement of the bubble therein is, substantially, completely inertialess and free of friction so that the resulting measurement is precise and of a high degree of accuracy.

Although both the inhalation and exhalation conduits of the spirometer device above described are open effectively to the atmosphere, it will be understood that the device may be incorporated in a closed breathing circuit, such as the circuit in an anesthetic gas machine, wherein the conduits would form a part of such a closed circuit. An example of an anesthetic gas machine that might be modified to incorporate the subject spirometer instrument is shown in the J. A. Heidbrink Patent No. 1,121,196. The apparatus disclosed in this patent includes essentially a face mask, inhalation and exhalation conduits connecting with the face mask, and series connected anesthetic vaporizing device, carbon dioxide adsorber, and a source of oxygen. The gases are conducted unidirectionally from the exhalation conduit through the series connected portions of the breathing circuit and thence to the inhalation conduit and back again to the face mask. It will be seen that in order to incorporate the subject device in such a circuit, a portion of the inhalation conduit, for example, would be replaced by the branch parallel passage means of the present invention, each of which would be provided with the described laminar-flow restricting means. Thus, instead of the outer ends of these branch passages being open effectively to the atmosphere as in the device presently described, each would be connected at their outer ends in the closed circuit in an equivalent pressure zone, such that the branch passages would provide parallel flow conduits through which corresponding divided portions of the total gas would be delivered to the inhalation side of the face mask.

The invention is not limited to the specific embodiment herein illustrated and described but may be used in other ways without departure from its spirit as defined by the following claims.

I claim:

1. A spirometer comprising a facepiece defining a breathing chamber adapted to be placed in communication with a patient's lungs, separate valve-controlled inlet and outlet conduits communicating with said chamber through which respiration gases are conducted, respectively, during inhalation and exhalation, a plurality of branch passages connected in series with one of said conduits and in parallel flow relationship to each other, laminar-flow restricting means in each of said branch passages, and flow-indicating means connected with one of said passages, responsive to the divided portion of the total gas flow conducted therethrough.

2. A spirometer substantially as set forth in claim 1 wherein said laminar-flow restricting means comprises a fine mesh screen.

3. A spirometer substantially as set forth in claim 2 wherein said screen is substantially 400 mesh.

4. A spirometer substantially as set forth in claim 1 wherein said flow-indicating means includes means effective to integrate the volume gas flow through said branch passage and give an accumulated flow reading directly, for a period covering a plurality of successive respiration cycles.

5. A spirometer substantially as set forth in claim 1 wherein said laminar-flow restricting means are, respectively, of larger and smaller effective flow areas, said flow-indicating means is connected with the branch passage having said restricting means of smaller effective flow area, and includes calibrated scale means effective to indicate the total gas flow through said flow passage by direct reading.

6. A spirometer device comprising a facemask, adapted to be worn by a patient, forming a breathing chamber communicating with the lungs of the patient when worn, said facemask having a substantially rigid body portion and a relatively flexible face-contacting peripheral portion effective to seal said breathing chamber from the surrounding atmosphere, separate valve-controlled inlet and outlet openings in said body portion communicating with said breathing chamber, means constituting a portion of said mask body portion forming a conduit communicating with one of said openings, said conduit having an outer terminal opening, means forming a secondary passage intersecting said conduit substantially adjacent said terminal opening thereof, laminar-flow restricting means disposed in said terminal opening and in said secondary passage at a point substantially adjacent the point of entrance thereof into said conduit, and flow-indicating means connected with said secondary passage, responsive to the divided portion of the total flow conducted therethrough.

7. A spirometer substantially as set forth in claim 6 wherein said laminar-flow restricting means comprise fine mesh screens.

8. A spirometer substantially as set forth in claim 6 wherein said flow-indicating means includes an elongated tube connected at one end to said secondary passage and adapted to receive in its bore a transverse film, adhering to the inner wall of said bore, forming a longitudinally displaceable outer membrane effectively sealing said bore, which is displaced longitudinally therein in response to changes in the volume of gas in said bore during respiration.

9. A spirometer comprising a facemask defining a breathing chamber adapted to be placed in communication with the lungs of a patient when the mask is worn, said mask comprising a substantially rigid body portion and a flexible peripheral face-contacting portion effective to seal said breathing chamber from the surrounding atmosphere, separate valve-controlled inlet and outlet ports in said facemask body portion communicating with said breathing chamber through which respiration gases are conducted, respectively, during inhalation and exhalation, means extending outwardly of said body portion forming a conduit communicating with said inlet port through which all of said inhalation gases are conducted to said inlet port, said conduit having an outer terminal opening, means forming a secondary passage intersecting said conduit substantially adjacent said terminal opening, laminar-flow restricting means disposed in said terminal opening and in said secondary passage substantially adjacent the point of entrance of said secondary passage into said conduit, and flow-indicating means connected to said secondary flow passage responsive to the gas flow therein whereby the total volumetric flow during each inhalation may be measured from the divided portion of the total gas flow through said secondary passage.

10. A flow-measuring device comprising a main flow conduit, a plurality of branch passages connected in series with said conduit and in parallel flow relationship to each other such that each of said passages carries a divided part of the total flow in said conduit, laminar-flow restricting means in each of said branch passages, and flow-indicating means connected with one of said passages, responsive to the divided portion of the total gas flow conducted therethrough.

No references cited.